March 21, 1950     E. A. ROCKWELL     2,501,005
HYDRAULIC MOTOR OPERATED CLUTCH
Filed Dec. 24, 1943     3 Sheets—Sheet 1
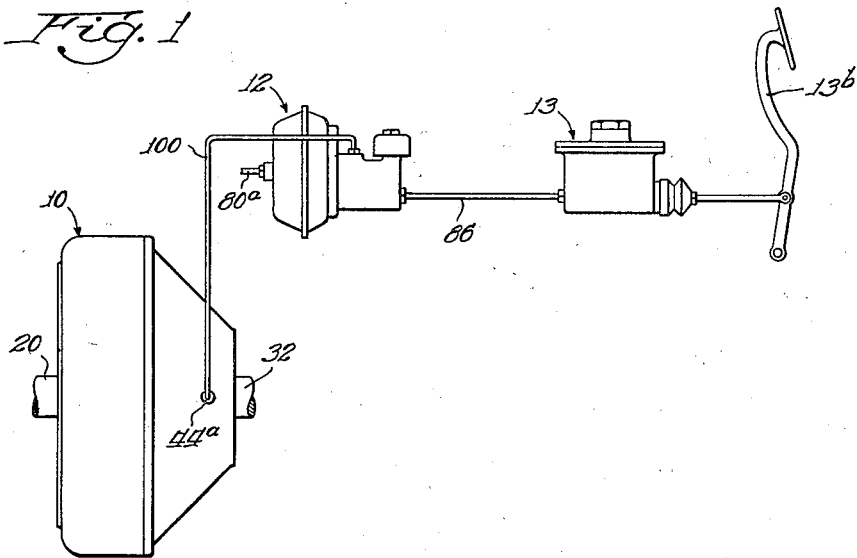
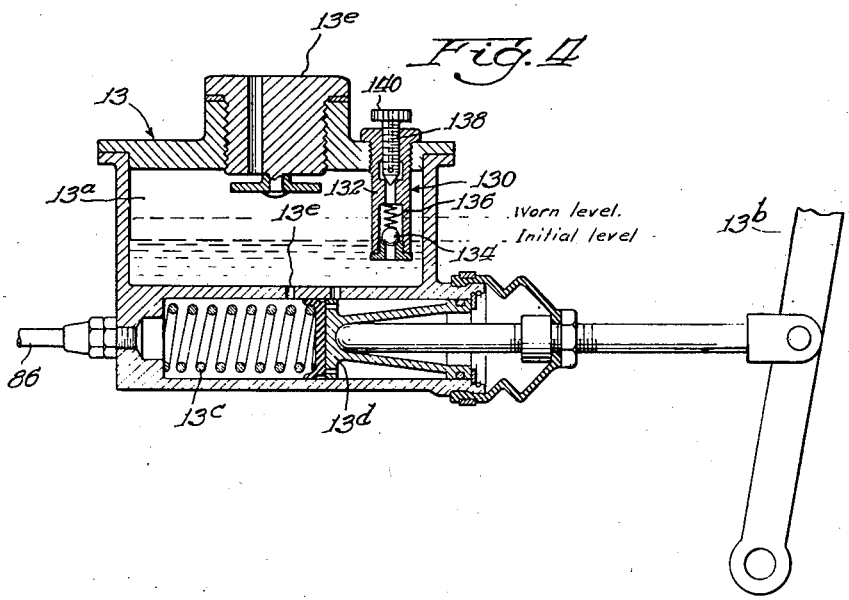
Inventor:
Edward A. Rockwell
By Edward C. Gritzbaugh
Atty

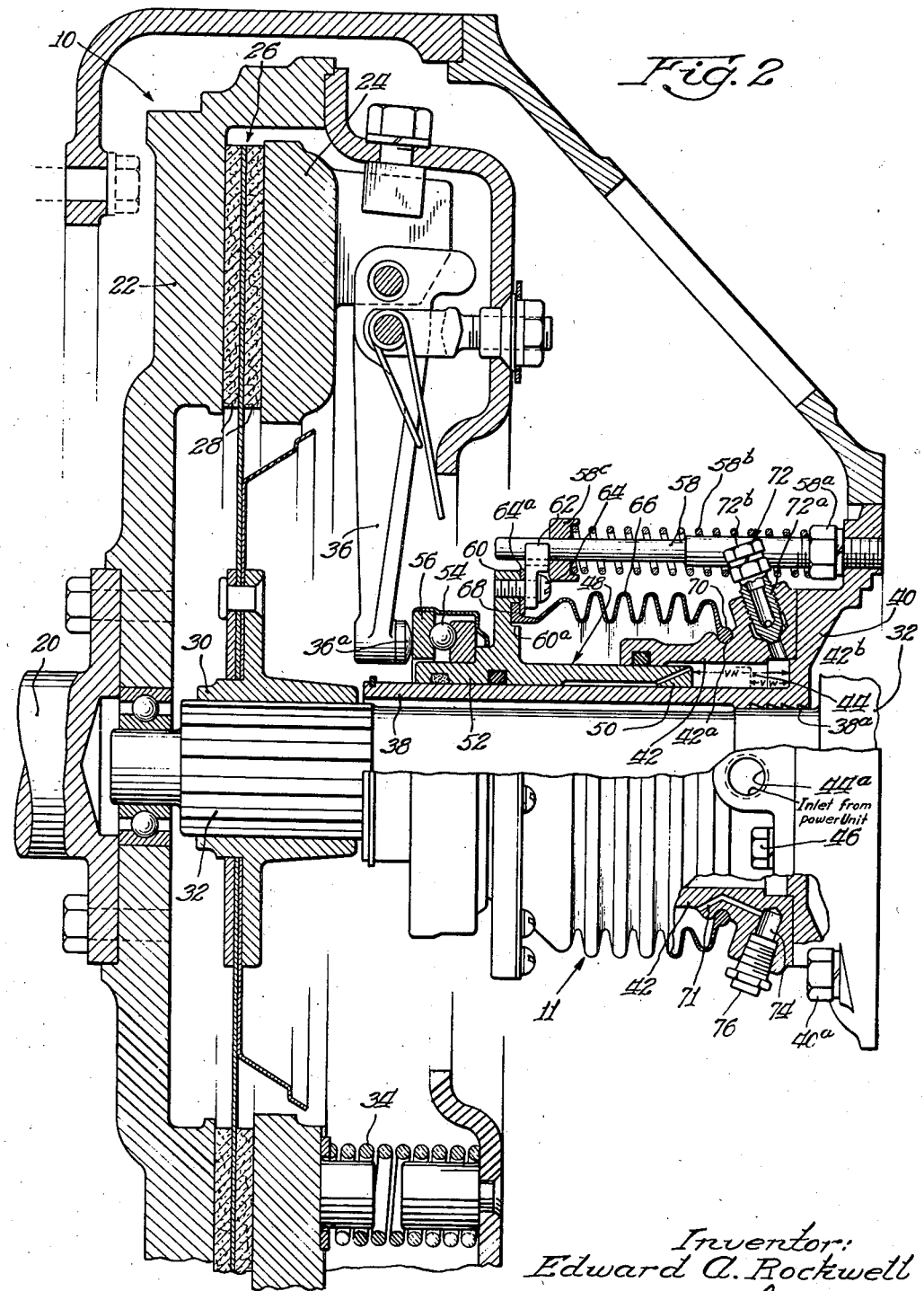

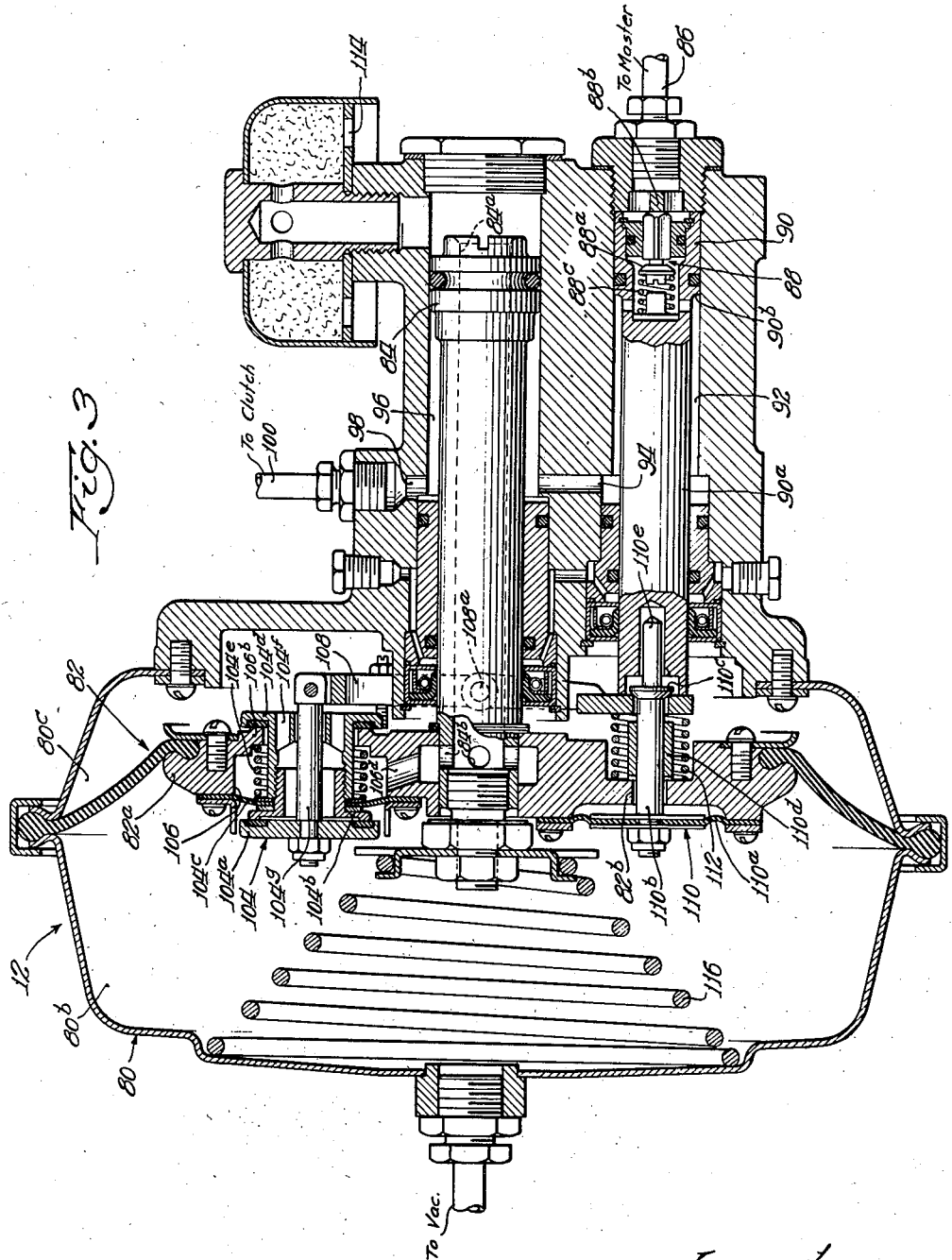

Patented Mar. 21, 1950

2,501,005

UNITED STATES PATENT OFFICE 2,501,005

HYDRAULIC MOTOR OPERATED CLUTCH

Edward A. Rockwell, Cleveland, Ohio, assignor, by mesne assignments, to Borg-Warner Corporation, Chicago, Ill., a corporation of Illinois Application December 24, 1943, Serial No. 515,602

3 Claims. (Cl. 192—91)

This invention relates generally to hydraulic pressure-operated devices and particularly to hydraulic motor-operated friction clutches.

The problem of effectively adjusting friction clutch assemblies for wear has been a serious one for a long time and has remained unsolved prior to the present invention. This problem, in its specific aspect as regards friction clutches, arises particularly out of the fact that a small amount of wear in the friction disc is multiplied many times in its effect on the long lever arms normally engaged by the axially disposed operating collar. The problem has been further aggravated by practical limitations as to pedal travel and increasing demands for power as the size and capacity of the clutch has been increased, thus rendering the available mechanical lever and linkage mechanisms between the operator and the clutch ineffective to accomplish satisfactory clutch operation.

It is, therefore, a broad object of my invention to provide in an operative mechanism, subject to wear in the connecting parts thereof, an improved automatic means functioning in the normal course of operation thereof to adjust for such wear, without requiring any separate manual adjusting operation.

A more particular object of my invention is the provision of a friction clutch assembly having an improved arrangement of hydraulic pressure fluid responsive operating means, including an arrangement for automatically adjusting the same for wear, particularly wear in the friction element of the clutch.

It is a further object to provide an operator controlled hydraulic pressure fluid supply link for the clutch operating motor and a power pressure intensifier interposed in said link effective to amplify the pressure in a definite ratio to that applied by the operator and including means automatically operable with successive operations by the operator effective to adjust the assembly for wear in the friction element of the clutch.

It is a more detailed object to provide in an arrangement of the above character for causing the wear to gradually move the displaceable element of the motor further and further in the direction of the closed end of the cylinder when the clutch is in engaged position and providing a receiving and storing arrangement for the excess fluid due to such reduction in volumetric capacity, the initial volumetric capacity of the motor being made sufficiently large to provide for the said reduction therein as wear takes place.

Further and more detailed objects, advantages and uses of my invention will become apparent from a reading of the following specification taken in connection with the accompanying drawing which forms a part thereof and wherein:

Fig. 1 shows schematically the relative arrangement of the important parts of my invention as applied to the operation of a clutch;

Fig. 2 is an enlarged, cross-sectional view of the clutch and hydraulic motor for operating the same;

Fig. 3 is an enlarged, cross-sectional view of the power pressure intensifier unit for operating the clutch motor; and Fig. 4 is a cross-sectional view of the master cylinder assembly.

Referring in greater detail to the figures of the drawing, I have disclosed a preferred embodiment of my invention in its special application to clutch operation. In the broader aspects of my invention it will be understood that the same has application to the operation of other mechanism wherein similar problems of wear and adjustment therefor exist.

A friction disc type clutch assembly indicated generally at 10 is provided with a special arrangement of hydraulic pressure fluid responsive motive means indicated generally at 11 for accomplishing the release of the clutch, this motive means being supplied with operating pressure through a power pressure intensifier unit 12 under the control of a remotely located manually operable master cylinder assembly 13 including a reservoir 13a into which excess liquid is introduced in compensating for wear. These principal parts are arranged and their subordinate components are so correlated that wear in the clutch is automatically compensated for and the necessary adjustments effected for maintaining zero clearance at all times between the elements in the operating linkage from the manual operative all the way through to the clutch. This correlation is such that as the friction disc of the clutch 10 is worn the same is effective through the operating levers forming a part thereof to gradually decrease the volumetric capacity of the hydraulic motor with the expansible element thereof in clutch disengaged position and this decrease in volumetric capacity is automatically compensated for by having the piston in the master cylinder uncover a port which communicates with the fluid reservoir when this piston is moved to retracted position with the result that any excess fluid is ejected to the reservoir.

It will be noted that this mode of coaction is quite distinguishable from that present in the operation of "make-up" arrangements now in common use wherein any loss of fluid due to leakage, for example, may be made up by having the master cylinder piston uncover a port in communication with the make-up reservoir, allowing make-up fluid to flow from the reservoir into the fluid link as distinguished from removal of fluid from the link into the reservoir.

It will thus appear that as wear takes place during the life of the assembly fluid replacement will be required less frequently if not eliminated altogether.

The well-known clutch arrangement 10, in which my invention is incorporated in a novel manner, may include a power input shaft 20, supporting in driving relation therewith a flywheel or back plate 22 and a pressure plate 24 also drivingly supported in axially adjustable relation to the back plate. A friction disc assembly 26 has the friction facings 28 thereon interposed between the back plate and the pressure plate, the hub portion 30 being supported on and drivingly connected to the power output shaft 32 by the usual splined arrangement. Coil compression springs 34 urge pressure plate 24 in the direction of engagement with the friction disc 28 and the reverse or release movement of the pressure plate is accomplished through a plurality of radially inwardly extending pivoted levers 36. Only one spring 34 and one lever 36 are shown for simplicity.

One of the most serious and troublesome problems in connection with the satisfactory and efficient operation of this class of clutches results from the wear in the friction facing of the clutch disc. Many proposed solutions have been offered heretofore for providing the requisite adjustment necessary to compensate for this wear.

This invention is particularly directed to the provision of and arrangement for operating the levers 36 in a more effective and satisfactory manner than herebefore provided which arrangement also incorporates a solution to the problem of adjustment for wear in the clutch parts including particularly wear in the friction facing. The present arrangement is effective to maintain "zero" clearance in the entire operating linkage extending from the pressure plate to the operating levers 36 through pressure fluid responsive operating motor 11, power intensifier 12 and manually operable master cylinder assembly 13.

Pressure fluid responsive arrangement or motive means 11 includes a first tubular member 38 received in embracing relation about power output shaft 32 with the inner terminal portion thereof adjacent the hub 30 of the clutch disc assembly 26. The outer terminal portion of tubular member 38 has a base or flange 40 extending radially therefrom supporting a second tubular member 42 of larger diameter than tubular member 38, the base member 40 also functioning to close the space between the adjacent terminal portions of tubular members 38 and 42 to thus define therebetween a cylinder 44. Tubular member 42 is shown as being fastened to flange 40 by a plurality of cap screws 46. It will be apparent that this construction of the tubular members is made to facilitate manufacture and assembly and that the same may be accomplished otherwise, such for example as making the two tubular members 38 and 42 in one integral assembly. A third, piston-like tubular assembly 49 includes a piston portion proper 50 operable in cylinder 44 and an external portion 52 the inner periphery of which guidably engages the inner tubular member 38. The external terminal portion thereof carries an anti-friction bearing and ring assembly including anti-friction balls 54 and cooperating ring 56 engaging the inner terminal portions 36a of clutch operating levers 36. As these levers 36 rotate with the pressure plate 24 the anti-friction rollers 54 and ring 56 limit to a minimum the friction imposed upon piston assembly 48 which is held against arcuate movement by a special arrangement to be described.

It is important to note that in a clutch of the present class, as facings 28 become worn the same will be evidenced by the gradual shifting of the off position of terminal lever portions 36a, this off position of the levers being the position in which the pressure plate 24 is in engagement with the friction facings known as the clutch engaged position. Since the lever arm in the present type of clutch is much longer than the work arm, wear of the clutch facings is thus amplified in its effect on shifting the off position of the levers 36. It is important to note that while wear in the friction facings results in gradual increased movement of the pressure plate 24 to the left in the drawing this wear is reflected through the terminals 36a of the levers by the reverse movement thereof to the right. Referring to cylinder 44, particular attention is directed to the fact that the above condition is fully taken care of by providing ample initial volumetric capacity, designated VN, within said cylinder, with a new clutch facing and with piston 50 in clutch engaging position. This initial volumetric capacity is sufficient to provide for the shifting of the inner terminal position of piston 50 as full wear in the clutch assembly takes place during which the volumetric capacity of cylinder 44 in clutch engaged position is reduced to a value designated VW. For example, I have found from actual construction and test that a clutch arrangement of the type disclosed will give very satisfactory operation for the wear life of the friction facing if the motor is given an initial volumetric capacity VN, with the pressure plate engaged, substantially two and one-half (2½) times the volumetric displacement of the piston in effecting complete release of the clutch. Specifically, I provide about 2½ cubic inches initial volumetric capacity where the piston displacement in releasing the clutch is one cubic inch. This will, of course, vary with different lever arrangements and lengths of lever arms and is readily obtainable by examining the position of lever terminals 36a with a new clutch facing in position and comparing this with the position of these terminals with a completely worn facing in position in the clutch, or the same may be readily calculated.

For the purpose of further insuring against the arcuate movement of the piston assembly due to frictional contact with the lever terminals 36a there is provided a guide 58 which may be in the form of a pin mounted on radially extending base flange 40, this guide pin extending in a generally axial direction in radially spaced relation to piston assembly 48. Guide pin 58 may be threadably mounted in flange 40 and locked thereto by nut 58a. A radial flange 60 extends from piston portion 52 and has extending radially therefrom a guide shoe 62 which may be fastened to the flange by screws 64, guide shoe functioning in cooperation with guide pin 58 to prevent arcuate movement of the piston assembly. While guide shoe 62 may be formed integral with radial flange 60, it has been found more expedient from a manufacturing point of view, to construct the same in the manner described. A coil compression spring 58b has one terminal thereof engaging lock nut 58a and the other terminal engaging a follower guide shoe 58c effective to exert sufficient pressure of follower shoe 58c against guide shoe 62 for preventing piston 50 from being shaken to the right in Figure 2 beyond its normal off position. This same result may be accomplished by providing sufficient friction between guide shoe 62 and guide pin 58.

The cylinder assembly is preferably arranged to be fastened to the transmission housing (not shown) as by means of bolts 40a passing through base flange 40. Output shaft 32 is freely rotatable within inner tubular member 38, there being provided a threaded portion 38a on the inner periphery of tubular member 38 for the purpose of feeding back any lubricant that may tend to leak from the housing side along shaft 32 in the direction of the clutch assembly.

For the purpose of sealing the moving parts of the motive means against the entrance of foreign matter, a flexible boot 66 is provided, one terminal of which is upturned to form a toe-like engageable rim 68 receivable in an annular groove 60a of radial flange 60 and confined therein by means of a plurality of circumferentially spaced washers 64a confined under the heads of screws 64. The opposite terminal of boot 66 is slightly enlarged to form a flexible bead or ring 70 received in a complementary peripheral recess 42a formed in the second or outer tubular member 42. The space within the flexible boot 66 is vented to the atmosphere by means of a passage 71 formed in the wall of outer tubular member 42 and a similarly formed transverse passage 74 containing the usual type of air vent fitting 76.

Entrapped air in cylinder 44 may be readily removed by means of air bleed assembly 72 of the usual construction which may include a tubular externally threaded housing 72a mounted in the threaded terminal of passage 42b in the outer tubular member 42, this housing 72a being closed by a readily removable threaded closure plug 72b. Operating pressure fluid is introduced to and withdrawn from cylinder 44 through port 44a in the wall of outer tubular member 42.

With the increased use of heavy automotive vehicles requiring large capacity clutches, it is no longer practicable to rely completely on manual operation of these clutches. The need for applying power to the operation of clutches as a supplement to the manual effort is well established. However, I am not aware of any previous arrangement which operates in an equivalent manner to provide the cooperation and mode of coaction herein disclosed. The important requirement herein contemplated is the provision of free uninterrupted fluid communication through the power intensifier or amplifier unit in the off position of the unit making practicable the novel compensating arrangement to be described.

While other forms of power pressure intensifiers or amplifiers may be employed so long as the same satisfy the required mode of coaction herein contemplated, I prefer to use the form indicated generally at 12. The details of this power pressure intensifier unit, aside from the novel combination thereof in the present arrangement, are being covered and claimed in a copending application Ser. No. 507,227, filed October 20, 1943, upon Intensifier for application of power.

Essentially, for the purpose of this case, a diaphragm or piston housing 80 contains a vacuum responsive power applying diaphragm or piston assembly 82 effective to operate a power pressure intensifying or amplifying piston 84 in response to the delivery of a predetermined value of control pressure from master cylinder 13. Manual control pressure when applied by application of the operator's foot to pedal 13b passes through conduit 86, open transition valve assembly 88, about modulating valve assembly control piston 90 in cylinder 92, through transverse passage 94 into power applying cylinder 96 out through delivery port 98 and conduit 100 to inlet port 44a of cylinder 44. This condition of communication between the master cylinder 13 and the clutch cylinder 44 through the power pressure intensifier prevails for all values of pressure below said predetermined pressure thus providing manual delivery of pressure to said clutch motor cylinder 44 up to said selected value of pressure and providing for free unobstructed return of pressure fluid from the clutch cylinder 44 back through the power pressure intensifier to the master cylinder when force of the operator's foot is removed from pedal 13b. This mode of operation through the intensifier unit 12 is significant in connection with automatic adjustment for wear in the clutch disc as will appear.

When the operator has applied a selected value of pressure to the operation of master cylinder 13 the same will act upon power pressure intensifying piston 84 and move the same to the right in the drawing against the action of a control coil compression spring 112, thus effecting the operation of the modulating valve assembly 104 which in turn controls the introduction alternately of vacuum and air to power applying diaphragm assembly 82. This power applying diaphragm assembly 82 is normally submerged in vacuum on both sides thereof. This vacuum may be supplied from any available source such as a vacuum pump or the manifold of the engine (not shown).

Modulating valve assembly 104 comprises a disc-like vacuum control valve 104a reciprocable into and out of engagement with a coaxially reciprocable seat 104b, the latter being mounted on a surrounding flexible diaphragm 104c supported about one terminal of a passage 106 in the power diaphragm hub portion 82a. The opposite terminal of passage 106 is formed to provide a second valve seat 106b having a second disc valve 104d cooperating therewith for modulating or controlling the introduction of air. A light coil compression spring 104e applies a force urging air valve 104d in the direction of its seat 106b. Valve seat 104b cooperating with vacuum control valve 104a has an externally threaded tubular protuberance connecting the same with a corresponding protuberance extending from air control valve 104d providing for reciprocation and preventing relative axial movement between valve seat 104b and valve 104d. Valve 104d is formed with a passage 104f therethrough for the communication of vacuum to the right side of power diaphragm assembly 82 when vacuum valve 104a is open to submerge both sides in vacuum as will appear. Vacuum control valve 104a is mounted on a coaxially extending valve stem 104g guidably mounted within the passage 104f in air control valve 104d. Valve stem 104g is connected with a walking beam-like lever 108 which has a fixed pivotal support 108a intermediate the ends thereof on hub 82a. The opposite terminal portion of lever 108 engages with the inner terminal of modulating control piston 90. A balancing diaphragm assembly 110 includes an auxiliary diaphragm 110a having the central portion thereof connected with walking beam lever 108 by a stem 110b and the peripheral portion thereof connected with the power applying diaphragm or piston hub 82a. A control coil compression spring 112 is interposed between hub 82a and walking beam 108 in such a manner that modulating control piston 90 is effective through walking beam 108 to compress control spring 112 following the initial movement of the power applying piston 84 to the right in response to manual pressure as will appear. Initially walking beam 108 is effective, as a result of the shift of power piston 84 to the right, to compress control spring 112 independently of modulating valve control piston 90 to crack open air valve 104d to effect the reversal of movement of power diaphragm assembly 82. Balancing diaphragm assembly 110 is given an effective area corresponding to that of vacuum control valve 104a to thus cancel out the effect of the pressure differential acting on vacuum valve 104a and which would otherwise be transmitted through walking beam 108 to control piston 90. The clearance between the connecting stem 110b and the opening 82b in diaphragm hub 82a may be relied upon to communicate pressure to the under side of diaphragm 110a. Stem 110b passes through an opening in walking beam lever 108 and a radial flange 110c controls the limit of movement of lever 108 away from hub 82a. A stop sleeve 110d limits the movement of lever 108 toward hub 82a. Inner terminal guide portion 110e of stem 110b guidably controls the relative movement between modulating control valve piston 90 and the hub 82a.

Communication with the atmosphere is had through air inlet 114, bore 84a of power intensifying piston 84, transverse passages 84b and 106d leading to air valve seat 106b.

When as above stated, the manually delivered fluid pressure from master cylinder 13 reaches a predetermined value determined by the strength of control spring 112 power pressure intensifying piston 84 will be shifted to the right in the drawing by the action of the pressure thereon, moving air control valve 104d to crack the same open sufficiently to permit the admission to chamber 80c of a relatively small amount of atmosphere. This admission of atmosphere to chamber 80c is effective to increase the differential pressure between opposite sides of said vacuum power applying diaphragm assembly 82 with the result that power diaphragm assembly 82 is stopped from further movement to the right and is shifted in the reverse direction to the left in the drawing, carrying with it power pressure intensifying piston 84 and acting through walking beam 108 to lap air valve 104d. The manually delivered pressure passing from master cylinder 13 through conduit 86 and transition control valve assembly 88 acting on modulating valve control plunger 90a of piston 90 becomes effective to cause the same to move to the left in the drawing with the result that transition valve 88a carried in the end of piston 90 is moved away from stop 88b normally holding the valve open and valve 88a caused to close under the influence of spring 88c, shutting off fluid communication between cylinder 92 and master cylinder 13 but not disturbing the application of master cylinder pressure to modulating valve control piston 90 which pressure continues to act on the rear side of transition valve assembly 88. The force which initially causes movement of control piston 90 is of course the result of pressure fluid in chamber 92 and the value of the pressure required is determined by the cross sectional area of the opening through which the plunger portion 90a is being expelled in the direction of control spring 112 and by the resistance offered by control spring 112.

It is important to note that working surface 90b of modulating valve control piston 90 is given a predetermined area having a definite fractional relationship with reference to the effective area of the back side or master cylinder side of the piston 90, with the result that the manual pressure delivered by the master cylinder 13 does a constant definite ratio of the total output work delivered to cylinder 44 of the clutch motor and what is equally important the operator receives a definite reaction or feel of the pressure being applied to the clutch motor. It will be noted that power pressure intensifying piston 84 is in effect a hydraulic fulcrum that is shifted by power applying diaphragm assembly 82, the power applied to the diaphragm bearing a definite ratio to the power applied to the end of the hydraulic lever, namely, that applied to piston 90. Similarly the travels of valve control piston 90 and amplifying piston 84 are correlated so that the two move together, it being impossible for the power amplifying piston to ever run ahead of the control piston 90.

When the operator desires to again effect engagement of the clutch the force on pedal 13b is relaxed and spring 13c, together with the pressure fluid, acts on piston 13d of the master cylinder returning the same to the position shown uncovering port 13e leading to reservoir 13a effecting compensation for the wear as will appear. Coil compression springs 34 of the clutch act through clutch levers 36 to move piston assembly 48 of the clutch into cylinder 44, forcing pressure fluid back through line 100. The returning pressure acts on amplifying piston 84 and on surface 90b of valve control piston 90 moving these pistons to the right in the drawings and back to their off position. As transition valve 88a engages its limit stop 88b the same is opened to reestablish communication between the clutch motor cylinder 44 and the master cylinder piston 13c.

Special attention is now directed to the fact that as the clutch facing has become worn the piston portion 50 will be required to move deeper into its cylinder 44 in order to effect complete engagement of the clutch. This is made possible by the fact that master cylinder piston has uncovered port 13e and transition valve 88a being open there is unobstructed or unrestricted flow to reservoir 13a. A sufficient positive pressure is maintained at all times to keep out air, the reservoir 13a being disposed in an elevated position. Thus there is provided an effective arrangement for automatically adjusting for any wear and for maintaining zero clearance in the operating linkage while at the same time providing power operation. It will be noted further that the usual valve mechanism in the master cylinder for maintaining a positive pressure has been eliminated as well as the pressure drop caused thereby.

It will be noted that in passing over rough surfaces with the clutch in engaged position, any tendency to shake piston 50 further to the right in Fig. 2 might tend to transfer fluid back through conduit 100, intensifier 12, conduit 86 and port 13c into reservoir 13a but for the special provision of means to prevent this from happening.

As above pointed out, spring 58b performs this important function in the preferred construction herein described by way of example.

In the further essential operation of the power unit 12 upon clutch engagement, return spring 116 is so chosen as to move power diaphragm assembly 82 to the right causing walking beam or lever 108 to close vacuum valve 104a—opened by the relaxation of force on pedal 13b—and subsequently crack open air valve 104d admitting enough air to cause power diaphragm assembly 82 to shift to the left an amount sufficient to balance spring 116 and lap air valve 104d, this position being shown in the drawing.

For the purpose of filling the system with liquid, including effecting the desired initial level of liquid in reservoir 13a as well as for bleeding air from the system, there is provided a reservoir oil bleed and level control assembly indicated generally at 130. This bleed assembly comprises essentially a depending tubular member 132 threadably mounted in the reservoir cover and extending downwardly to the correct level for positioning ball check valve 134 in a position where the same will be effective to establish the proper initial liquid level with a new clutch plate in the clutch assembly and providing for sufficient space above the liquid level in the reservoir to receive additional liquid ejected from the system during the wear life of the clutch plate after compensating for such wear. Ball check valve 134 is urged in the direction of its seat by a coil compression spring 136. The outer terminal of tubular member 132 may have threadably mounted therein a bleed assembly of the same form as air bleed assembly 72 described above in connection with clutch motor 11 and including a threaded closure plug 140.

It will now appear that the system may be charged with the required volume of liquid and the air bleed therefrom while at the same time leaving the requisite space in the reservoir above the initial liquid level by first removing closure plug 13e and connecting thereto the usual liquid supply unit. Air bleed closure plug 72b and oil bleed closure plug 140 are then removed and with the clutch in off position, as shown in Fig. 2, liquid is introduced until air free liquid is discharged from air bleed assembly 72 whereupon plug 72b is replaced. When the liquid level in the reservoir has risen to that indicated as the "initial level" then further rise of liquid in the reservoir will be evidenced by liquid being discharged from oil bleed 138 whereupon further delivery is shut off and oil bleed closure plug 140 as well as reservoir closure plug 13e are replaced.

While I have disclosed my invention in connection with a certain specific embodiment thereof, it is to be understood that this is by way of example and not limitation, my invention being defined by the appended claims which should be given a scope commensurate with the prior art.

I claim:

1. In an arrangement for transmitting operating pressure to a device to be moved through a predetermined range and automatically adjusting for wear therein, said arrangement including means defining a linkage having an off position which is gradually changed due to said wear, means defining a hydraulic motor for operating said linkage, said motor including a fluid displaceable piston-like element for moving said linkage through said predetermined range and being so arranged that said gradual change of position of said linkage due to wear is effective to reduce the volumetric capacity of said motor with said piston in its retracted position, means defining a pressure intensifier for delivering operating pressure to said motor, a master cylinder including a manually operable piston therein delivering pressure to said intensifier for controlling said power intensifier, said piston being effective to deliver a definite proportional part of the total operating pressure to said motor, a fluid storage chamber, conduit means connecting said master cylinder with said intensifier and said intensifier with said motor, means placing said storage chamber in fluid communication with said conduit in response to movement of said master piston to the off position thereof whereby the decrease in volumetric capacity of said motor in the retracted position of said motor piston resulting from said wear is effective to cause delivery of excess fluid to said storage chamber and thus automatically compensate for said wear and means operable on the movement of said linkage a predetermined distance in one direction effective to control the extent of the further movement of said motor piston in the retracted direction during periods between successive operations, whereby the volume displacement of the piston will remain substantially constant during successive operations.

2. In a clutch and power operating arrangement therefor, including a friction disc of the type having spring means for effecting the engagement thereof and linkage means for effecting the release thereof, a hydraulic motor for operating said linkage, said motor including a fluid displaceable piston-like element for moving said linkage through a predetermined range and being so arranged that wear of said clutch plate is effective through said linkage to reduce the initial volumetric capacity of said motor in the engaged position of said clutch, a power pressure intensifier for delivering operating power pressure to said motor, a manually operated master cylinder including a piston therein for controlling said power pressure intensifier and delivering a definite proportional part of said operating pressure to said motor, a storage chamber, conduit means connecting said master cylinder with said intensifier and said intensifier with said motor, means placing said storage chamber in comunication with said conduit in response to movement of said master cylinder piston to the off position thereof whereby the decrease in volumetric capacity of said motor in the off position of said fluid displaceable piston-like element thereof due to wear in said plate is effective to deliver such excess of fluid to said storage chamber and thus automatically adjust for wear in said plate and means comprising a retractable stop effective to resist retraction of said motive piston beyond a predetermined position thereof in the off direction of movement of said clutch during periods between successive clutch operations, whereby the volume displacement of said motive piston will remain substantially constant during successive operations of said clutch for a given disengagement movement during the wear of said friction disc.

3. In an arrangement for transmitting operating pressure to a device to be moved through a predetermined range and automatically adjusting for wear, said arrangement including means defining a linkage having an off position which is gradually changed due to said wear, means defining a hydraulic pressure responsive motor including a piston-like displaceable element engaging said linkage for operating the same through said predetermined range in a manner such that as said wear takes place the volumetric capacity of said motor in the off position of said piston-like element is reduced by said piston-like element being moved by said linkage in additional increments in the volume reducing direction beyond the initial off position thereof, said motor being given an initial excess volumetric capacity in the off position of said piston-like element to allow for a predetermined amount of said wear and means for successively delivering hydraulic pressure to and relieving the same from said motor, said means including a storage chamber, means responsive to the relieving of said delivery pressure effective to deliver said excess of hydraulic fluid to said storage means as the volumetric capacity of said motor is reduced by said wear, and control defining means effective to oppose the telescoping movement of said piston beyond the off position of said linkage effective to prevent said piston from being shaken beyond said off position which would cause undesirable transfer of fluid to said reservoir in addition to the transfer of said excess fluid resulting from wear, whereby the volume displacement of said piston-like element will remain substantially constant during the interval between successive operations.

EDWARD A. ROCKWELL.

REFERENCES CITED

The following references are of record in the file of this patent:

UNITED STATES PATENTS

| Number | Name | Date |
|---|---|---|
| 1,934,206 | Page | Nov. 7, 1933 |
| 2,060,692 | Rockwell | Nov. 10, 1936 |
| 2,135,617 | Geyer | Nov. 8, 1938 |
| 2,272,327 | Sauzedde | Feb. 10, 1942 |
| 2,322,063 | Schnell | June 15, 1943 |
| 2,332,340 | Price | Oct. 19, 1943 |
| 2,334,383 | Carr | Nov. 16, 1943 |

FOREIGN PATENTS

| Number | Country | Date |
|---|---|---|
| 547,465 | Great Britain | Aug. 28, 1942 |
| 662,766 | France | Mar. 25, 1929 |